(12) United States Patent
Sambhwani et al.

(10) Patent No.: US 8,942,209 B2
(45) Date of Patent: Jan. 27, 2015

(54) SYSTEMS AND METHODS FOR SUPPORTING AN ENHANCED SERVING CELL CHANGE WHEN MOVING AMONG DIFFERENT CELL TYPES

(75) Inventors: Sharad Deepak Sambhwani, San Diego, CA (US); Mario Mark Scipione, Del Mar, CA (US); Rohit Kapoor, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 12/854,770

(22) Filed: Aug. 11, 2010

(65) Prior Publication Data

US 2011/0051692 A1    Mar. 3, 2011

Related U.S. Application Data

(60) Provisional application No. 61/233,421, filed on Aug. 12, 2009.

(51) Int. Cl.
*H04B 7/12* (2006.01)
*H04W 36/00* (2009.01)
*H04W 36/18* (2009.01)

(52) U.S. Cl.
CPC .......... *H04W 36/0072* (2013.01); *H04W 36/18* (2013.01)
USPC ........................................................ 370/332

(58) Field of Classification Search
CPC .................................................. H04W 36/18
USPC ............................ 370/328–338; 455/436–444
See application file for complete search history.

(56) References Cited

U.S. PATENT DOCUMENTS

| | | | |
|---|---|---|---|
| 8,233,451 B2 * | 7/2012 | Marinier et al. | 370/331 |
| 2008/0057970 A1 | 3/2008 | Takada et al. | |
| 2008/0176568 A1 * | 7/2008 | Palanki et al. | 455/436 |
| 2008/0194262 A1 * | 8/2008 | Choi et al. | 455/437 |

(Continued)

FOREIGN PATENT DOCUMENTS

| | | |
|---|---|---|
| EP | 1148753 A2 | 10/2001 |
| EP | 1773075 A2 | 4/2007 |

(Continued)

OTHER PUBLICATIONS

Huawei, Discussion on supplementary carrier controlling, R2-083520, Fu Jul. 4, 2008 Lance, 3GPP, paragraph 2, URL: http://www.3gpp.org/ftp/tsg_ran/WG2_RL2/TSGR2_62bis/Docs/R2-083520.zip.

(Continued)

*Primary Examiner* — Ricky Ngo
*Assistant Examiner* — Ben H Liu

(57) ABSTRACT

A system and method enable handover from a DC-HSUPA-capable node in a cellular wireless network to a non-DC-HSUPA-capable node. According to various aspects of the present disclosure, a handover may implement a legacy serving cell change procedure or an enhanced serving cell change procedure. In either case, signaling from the network to user equipment includes information to enable the user equipment to change or remove an Active Set when undergoing a handover from a cell with two uplink carriers and accordingly two Active Sets, to a cell with one uplink carrier and accordingly one Active Set.

50 Claims, 8 Drawing Sheets

(56) References Cited

U.S. PATENT DOCUMENTS

| | | | |
|---|---|---|---|
| 2009/0042578 A1* | 2/2009 | Rinne et al. | 455/442 |
| 2010/0015985 A1* | 1/2010 | Chang et al. | 455/442 |
| 2010/0222059 A1* | 9/2010 | Pani et al. | 455/436 |
| 2011/0065438 A1* | 3/2011 | Bergman et al. | 455/436 |

FOREIGN PATENT DOCUMENTS

| | | |
|---|---|---|
| JP | 2001309432 A | 11/2001 |
| JP | 2008060878 A | 3/2008 |

OTHER PUBLICATIONS

Ericsson, "Mobility in DC-HSUPA", 3GPP TSG RAN WG2 #66, San Francisco, USA, May 4-8, 2009, R2-092943, pp. 1-2.

Huawei : "Dynamic activation and deactivation of secondary carrier for DC-HSUPA", 3GPP Draft; R2-093158 Dynamic Activation and Deactivation of Secondary Carrier for DC-HSUPA, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, pp. 1-4, XP050340875.

Qualcomm Europe, "Activation/De-Activation of Secondary UL Carrier in DC-HSUPA", 3GPP TSG-RAN WG1 #57 May 4-May 8, 2009 San Francisco, USA, R1-091727, pp. 1-6.

Qualcomm Europe: "DC-HSUPA impact on RAN2 specifications," 3GPP Draft; R2-092156 DC-HSUPA Impact on RAN2 Specifications, 3rd Generation Partnership Project (3GPP), Mobile Competence Centre; 650, Route Des Lucioles; F-06921 Sophia-Antipolis Cedex; France, no. Seoul, Korea; Mar. 17, 2009, XP050339993.

Huawei, "Discussion on active sets and measurements in DC-HSUPA", 3GPP Draft, R2-093157, 3rd Generation Partnership Project (3GPP), Mobile Competence Centre, 650, Route Des Lucioles, F-06921 Sophia-Antipolis Cedex, France, no. San Francisco, USA, Apr. 27, 2009, XP050340874, [retrieved on Apr. 27, 2009].

International Search Report and Written Opinion—PCT/US2010/035463, International Search Authority—European Patent Office—Mar. 4, 2011.

Qualcomm Europe, "Active Set and Mobility Management in DC-HSUPA", 3GPP Draft, R2-092994 DC_HSUPA_MOBILITY, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050340777, [retrieved on Apr. 28, 2009] the whole document.

Qualcomm Europe, "Serving Cell Change Procedures for DC-HSUPA", 3GPP Draft, R2-094450, 3rd Generation Partnership Project (3GPP), Mobile Competence Centre, 650, Route Des Lucioles, F-06921 Sophia-Antipolis Cedex, France, no. Shenzhen, China, Aug. 18, 2009, XP050352628, [retrieved on Aug. 18, 2009].

* cited by examiner

SYSTEMS AND METHODS FOR SUPPORTING AN ENHANCED SERVING CELL CHANGE WHEN MOVING AMONG DIFFERENT CELL TYPES

CROSS-REFERENCE TO RELATED APPLICATION(S)

This application claims the benefit of U.S. Provisional Patent Application No. 61/233,421, titled "SUPPORT FOR E-SCC WHEN UE GOES FROM DC-HSUPA CAPABLE CELL TO NON-DC-HSUPA CAPABLE CELL," filed on Aug. 12, 2009, the disclosure of which is expressly incorporated by reference herein in its entirety.

BACKGROUND

1. Field

Aspects of the present disclosure relate generally to wireless communication systems, and more particularly, to handovers between different cell types in a cellular wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

A system and method enable handover from a DC-HSUPA-capable node in a cellular wireless network to a non-DC-HSUPA-capable node. According to various aspects of the present disclosure, a handover may implement a legacy serving cell change procedure or an enhanced serving cell change procedure. In either case, signaling from the network to user equipment may include information to enable the user equipment to change or remove an Active Set when undergoing a handover from a cell with two uplink carriers and accordingly two Active Sets, to a cell with one uplink carrier and accordingly one Active Set.

In an exemplary aspect of the disclosure, a method of communication in a wireless network includes establishing communication with the wireless network utilizing a first carrier and a second carrier for each of an uplink and a downlink, maintaining a first active set comprising a list of any cells in the wireless network that meet first criteria, the first active set corresponding to the first carrier, maintaining a second active set comprising a list of any cells in the wireless network that meet second criteria, the second active set corresponding to the second carrier, and receiving a notification not to utilize the second active set or the second carrier after a handover to a target cell.

In another exemplary aspect of the disclosure, an apparatus for communication in a wireless network includes means for establishing communication with the wireless network utilizing a first carrier and a second carrier for each of an uplink and a downlink, means for maintaining a first active set comprising a list of any cells in the wireless network that meet first criteria, the first active set corresponding to the first carrier, means for maintaining a second active set comprising a list of any cells in the wireless network that meet second criteria, the second active set corresponding to the second carrier, and means for receiving a notification not to utilize the second active set or the second carrier after a handover to a target cell.

In yet another exemplary aspect of the disclosure, a computer program product for use in a wireless network includes a computer-readable medium comprising code for establishing communication with the wireless network utilizing a first carrier and a second carrier for each of an uplink and a downlink, maintaining a first active set comprising a list of any cells in the wireless network that meet first criteria, the first active set corresponding to the first carrier, maintaining a second active set comprising a list of any cells in the wireless network that meet second criteria, the second active set corresponding to the second carrier, and receiving a notification not to utilize the second active set or the second carrier after a handover to a target cell.

In yet another exemplary aspect of the disclosure, an apparatus for communication in a wireless network includes at least one processor and a memory coupled to the at least one processor. Here, the at least one processor is configured to establish communication with the wireless network utilizing a first carrier and a second carrier for each of an uplink and a downlink, maintain a first active set comprising a list of any cells in the wireless network that meet first criteria, the first active set corresponding to the first carrier, maintain a second active set comprising a list of any cells in the wireless network that meet second criteria, the second active set corresponding to the second carrier, and receive a notification not to utilize the second active set or the second carrier after a handover to a target cell.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

Figure 1:
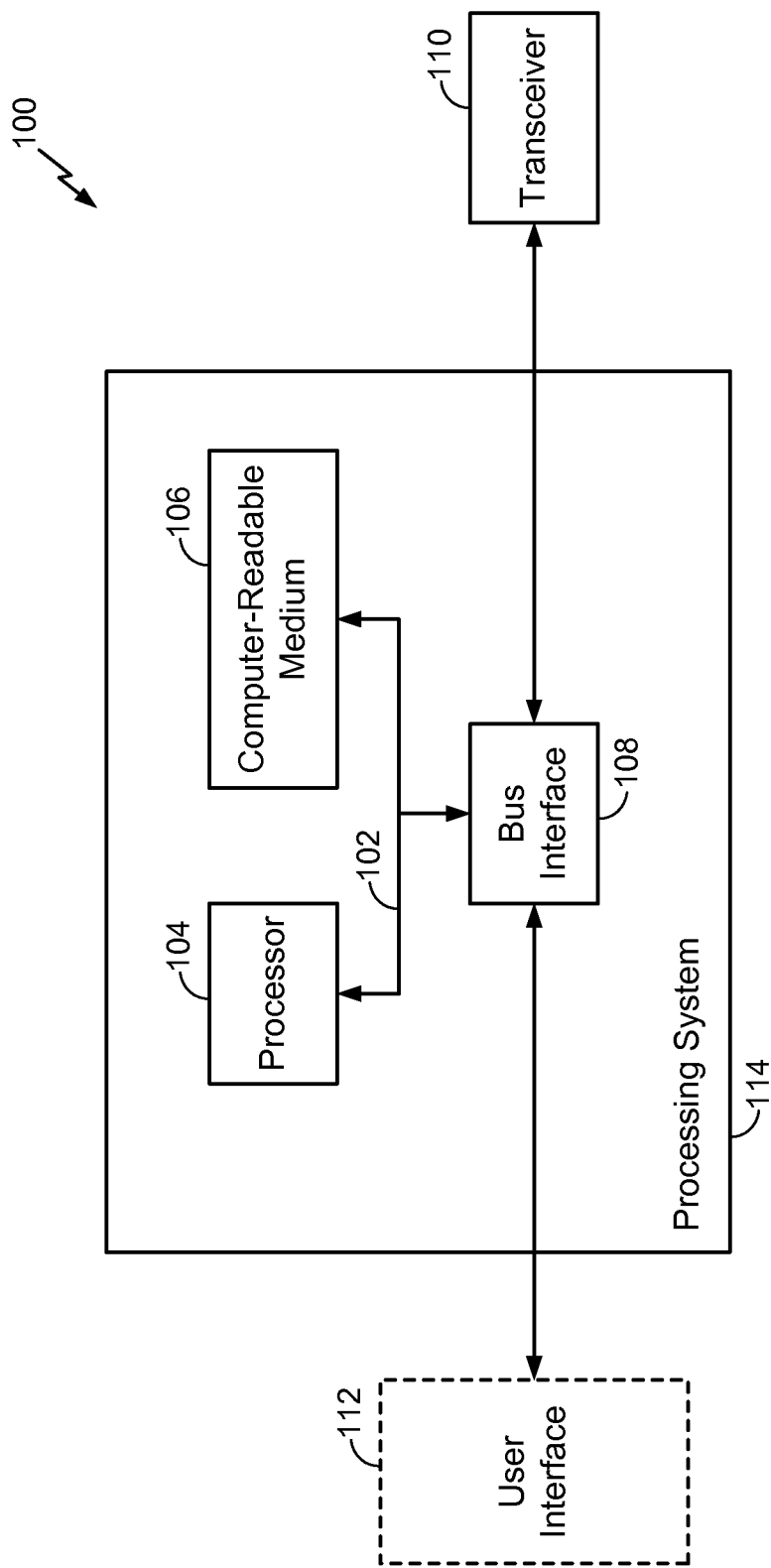
FIG. 1 is a diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
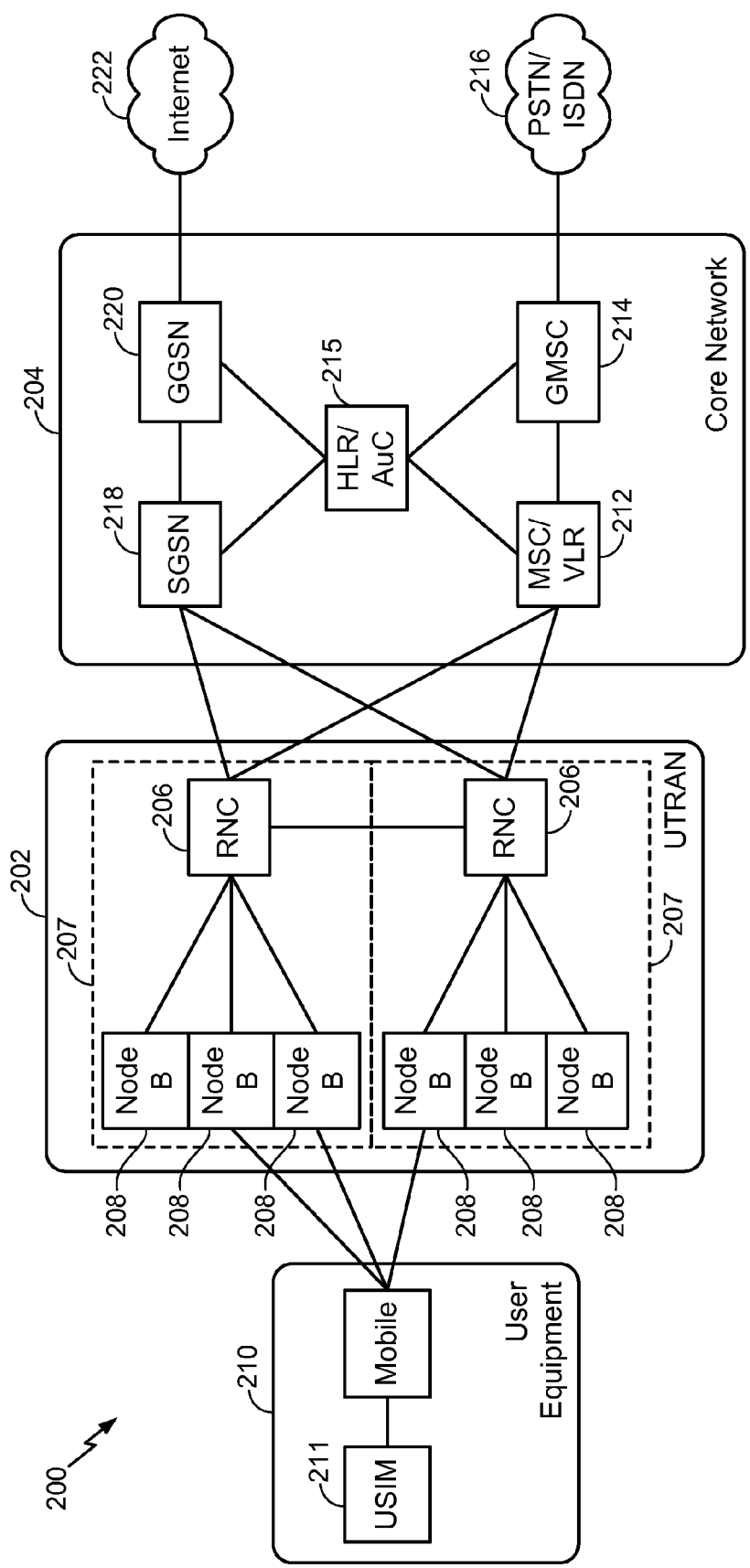
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as RNS 207, each including a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. Moreover, certain applications may utilize femtocells served by a home Node B (HNB), home enhanced Node B (HeNB), femto access point (FAP), access point base station, etc. For clarity, in the illustrated example, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The CN domain 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 3:
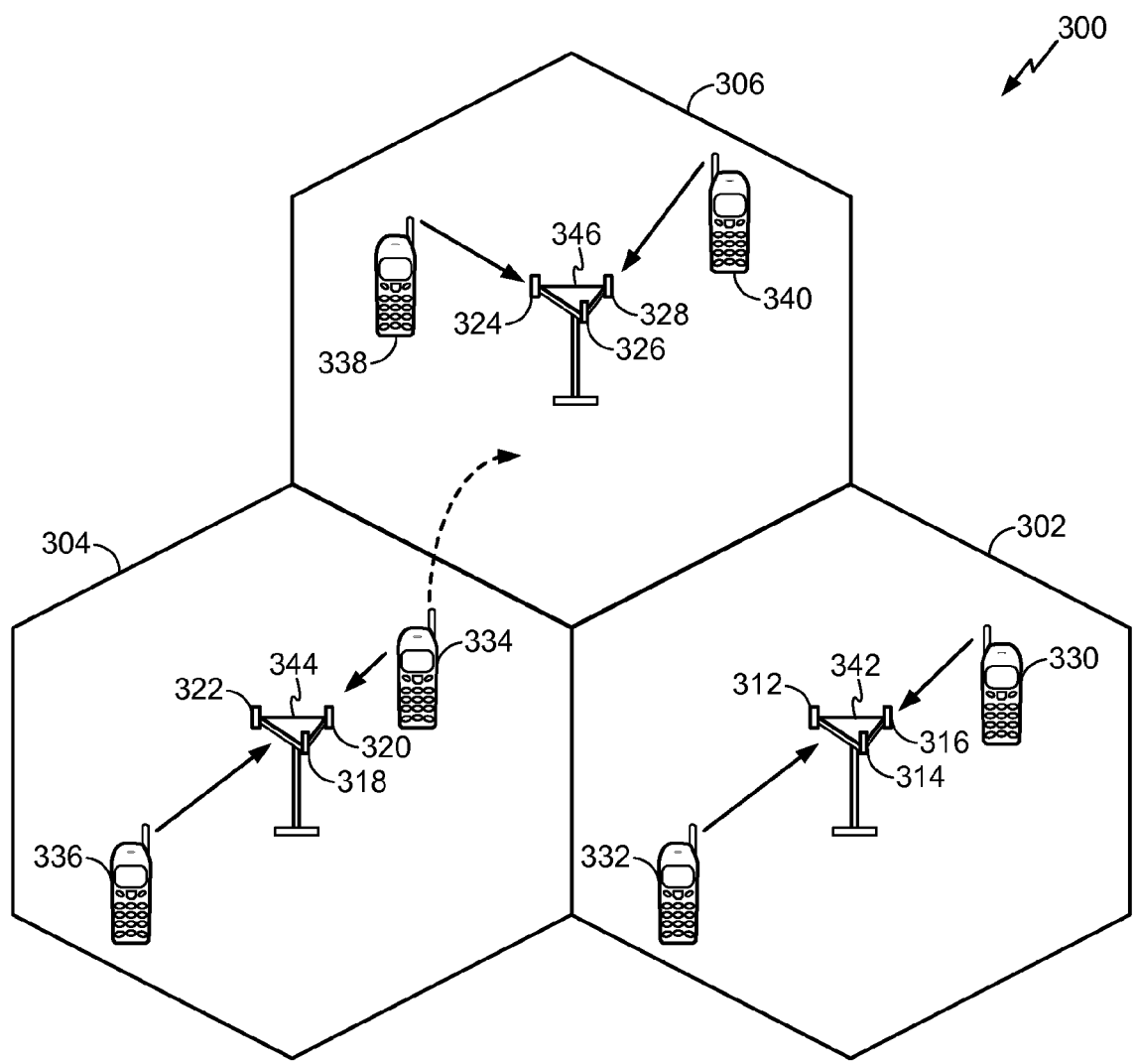
FIG. 3 is a conceptual diagram illustrating an example of an access network.

Referring to FIG. 3, an access network 300 in a UTRAN architecture is illustrated. The multiple access wireless communication system includes multiple cellular regions, including geographic coverage areas 302, 304, and 306, each of which may include one or more sectors. The multiple sectors can be formed by groups of antennas with each antenna responsible for communication with UEs in a portion of the coverage area. For example, in coverage area 302, antenna groups 312, 314, and 316 may each correspond to a different sector. In coverage area 304, antenna groups 318, 320, and 322 each correspond to a different sector. In coverage area 306, antenna groups 324, 326, and 328 each correspond to a different sector. The coverage areas 302, 304 and 306 may include several wireless communication devices, e.g., User Equipment or UEs, which may be in communication with one or more sectors of each coverage area 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective coverage areas 302, 304, and 306.

As the UE 334 moves from the illustrated location in coverage area 304 into coverage area 306, a serving cell change (SCC) or handover may occur in which communication with the UE 334 transitions from the coverage area 304, which may be served by a Node B referred to as the source cell, to coverage area 306, which may be served by a Node B referred to as the target cell. Management of the handover procedure may take place at the UE 334, at the Node Bs corresponding to the respective coverage areas, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as those served by Node Bs corresponding to coverage areas 306 and 302. Further, depending on the quality of these parameters, the UE 334 may maintain communication with one or more of the neighboring cells. During this time, the UE 334 may maintain an Active Set, that is, a list of neighboring cells that the UE 334 is simultaneously connected to (i.e., the UTRA Node Bs that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization.

CDMA2000 and UMB are described in documents from the 3GPP2 organization. The actual wireless communication standard and the multiple access technology employed will depend on the specific application and the overall design constraints imposed on the system.

Figure 4:
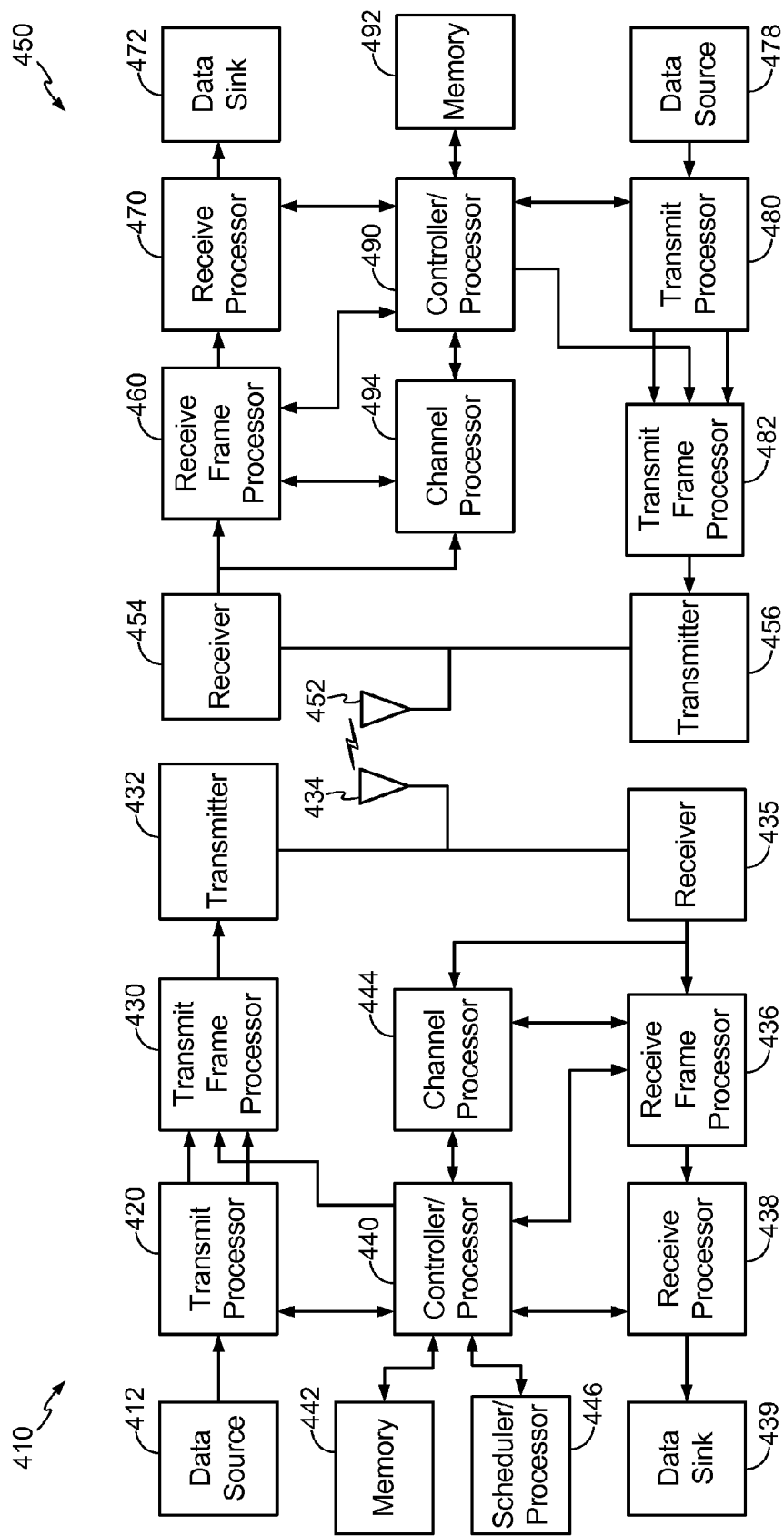
FIG. 4 is a block diagram conceptually illustrating an example of a Node B in communication with a UE in a telecommunications system.

FIG. 4 is a block diagram of a Node B 410 in communication with a UE 450, where the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an ACK and/or NACK protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Figure 5:
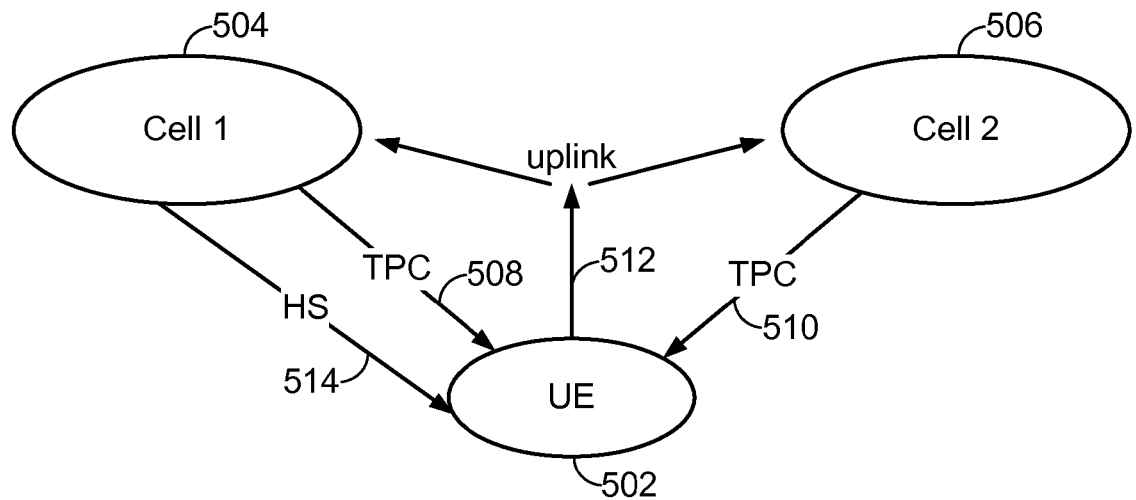
FIG. 5 is a conceptual diagram illustrating a soft handover in a single carrier HSDPA system.

Various cellular wireless communication systems may utilize a make-before-break serving cell change (SCC) frequently referred to as a soft handover. During a soft handover, a UE establishes communication with the target cell before breaking the connection with the source cell. FIG. 5 illustrates a UE 502 engaged in a soft handover between a source cell 504 and a target cell 506 in a single carrier system (i.e., using only carrier frequency f1). In the illustration, the source cell 504 is the serving cell, meaning that the source cell 504 is providing a downlink to the UE, including a high-speed data channel 514. Further, both the source cell 504 and the target 506 cell provide transmit power control (TPC) information 508, 510 to the UE 502 on suitable channels. The uplink 512 from the UE 502 is decoded by both the source cell 504 and the target cell 506. Here, while the UE 502 is in soft handover, the HSDPA channel 514 is only provided by the serving cell 504.

Figure 6:
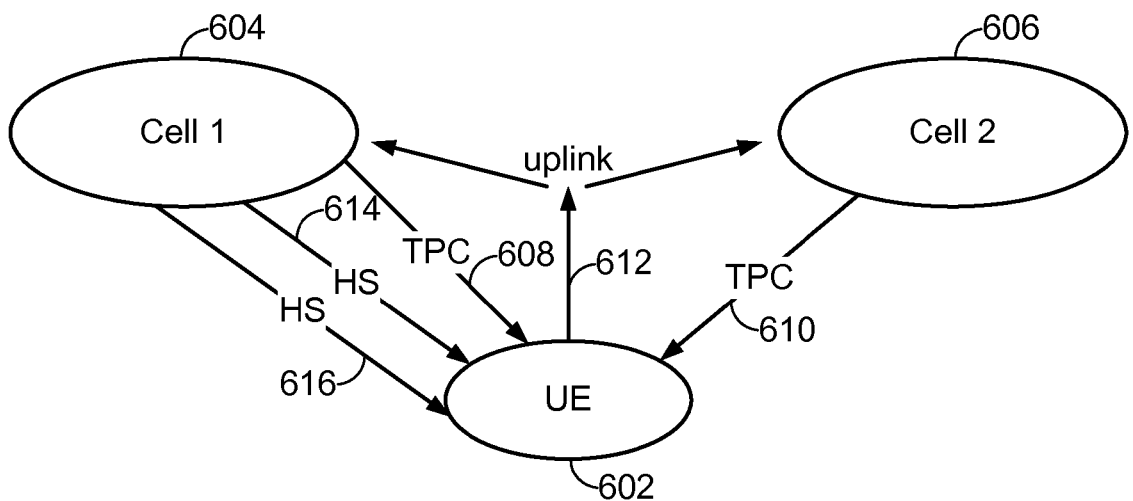
FIG. 6 is a conceptual diagram illustrating a soft handover in a dual carrier DC-HSDPA system.

In release-8 of the 3GPP family of standards, among other improvements, the downlink for HSDPA communication was specified to enable dual carriers (DC-HSDPA). FIG. 6 illustrates a UE 602 engaged in a soft handover between a source cell 604 and a target cell 606 in a DC-HSDPA system. As in FIG. 5, the UE 602 is transmitting an uplink 612 that is being decoded by the source cell 604 and the target cell 606, and the source and target cells each provide TPC information 608, 610 to the UE 602 on suitable downlink channels. Also, the source cell or serving cell 604 provides one of its downlinks on a high-speed data channel 614. Each of these signals, that is, the uplink 612, the downlink TPC information 608, 610, and the downlink data 614, share a first carrier frequency f1, separated by a suitable duplex distance for the respective uplink and downlink transmissions (assuming a frequency division duplex system). In addition, the serving cell 604 provides a second downlink stream 616 on a second carrier frequency f2. Hereinafter, the terminologies "anchor carrier" and "primary carrier", and "supplementary carrier" and "secondary carrier" will be used interchangeably, respectively. The "first carrier" (or "second carrier") may be either the anchor carrier or the secondary carrier. For multi-carrier operation more than one supplementary carrier or secondary carrier may exist. Frequently, the first carrier f1, which is shared by the uplink and downlink, is called the anchor carrier, while the second carrier f2, which provides a downlink 616 from the serving cell 604, is referred to as the secondary carrier. Because there is no uplink channel on the second carrier f2, the UE 602 generally does not maintain an Active Set for the second carrier, and only maintains an Active Set for the first carrier. Here, as in the previous example, while the UE 602 is in soft handover, all downlink data (here, on two HSDPA carriers) is provided exclusively by the serving cell 604.

Figure 7:
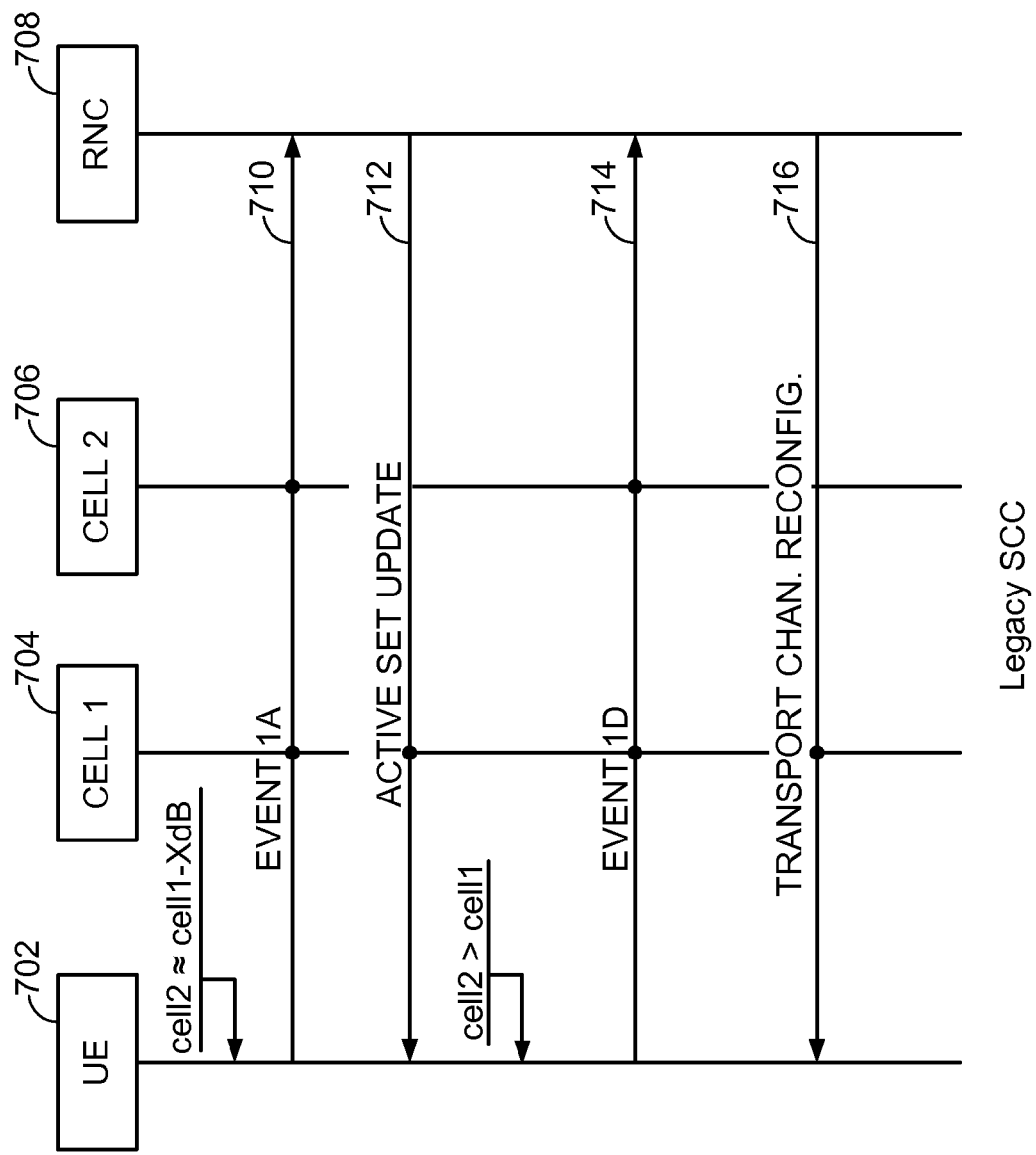
FIG. 7 is a call flow diagram illustrating a legacy serving cell change procedure.

FIG. 7 is a call flow diagram illustrating a soft handover process that may be utilized in a single carrier system and in a dual carrier system, referred to herein as a "legacy" serving cell change (SCC). Those skilled in the art will comprehend that the illustration does not show all signaling between the respective nodes, but only shows certain messages sent between the respective nodes for ease of illustration.

As discussed above, a UE 702 may monitor certain parameters and characteristics of the serving cell 704 and one or more neighboring cells. As an example for an FDD system, the UE 702 may monitor a pilot signal power of the respective cells. When one of the neighboring cells, i.e., cell 2 706, has a pilot signal power that exceeds a threshold or reaches a certain reporting range, (e.g., reaching within approximately X dB of the pilot signal strength of the serving cell 704), the UE 702 may provide an RRC message 710 (i.e., a layer 3 message) frequently called a Measurement Report message including notification of "event 1a." The RNC 708 may then respond to the Measurement Report message 710 with an RRC Active Set Update message 712, instructing the UE 702 to add cell 2 706 to its Active Set.

Later, if and when the UE 702 detects that the pilot signal power of cell 2 706 exceeds that of cell 1 704, the UE 702 may provide a second RRC Measurement Report message 714 including notification of "event 1d." The RNC 708 may then respond to the Measurement Report message 714 with an RRC Transport Channel Reconfiguration Request message (or other similar message) 716 including configuration information for setting up a connection with cell 2 706, also referred to as the target cell. After the handover is complete, cell 2 706 is referred to as the serving cell. It should be noted that each of the above signals provided from the RNC 708 to the UE 702 (i.e., the Active Set Update message 712 and the Transport Channel Reconfiguration Request message 716) are provided utilizing the downlink from the source cell, i.e., cell 1 704.

In some cases, such as when a UE is moving rapidly from one cell to another, the signal quality from the serving cell may degrade too rapidly, and processing and/or transmission delays may result in a dropped call. That is, utilizing the legacy SCC procedure discussed above and illustrated in FIG. 7, if the signal quality from cell 1 704 degrades too rapidly, the UE 702 may not receive the RRC Transport Channel Reconfiguration Request message 716 on the downlink from cell 1 704. Here, because this message included synchronization and other information related to setting up communication with cell 2 706, the UE 702 lacks this information and is unable to establish a connection with cell 2 706 before the connection with cell 1 704 is lost, resulting in a dropped call.

Figure 8:
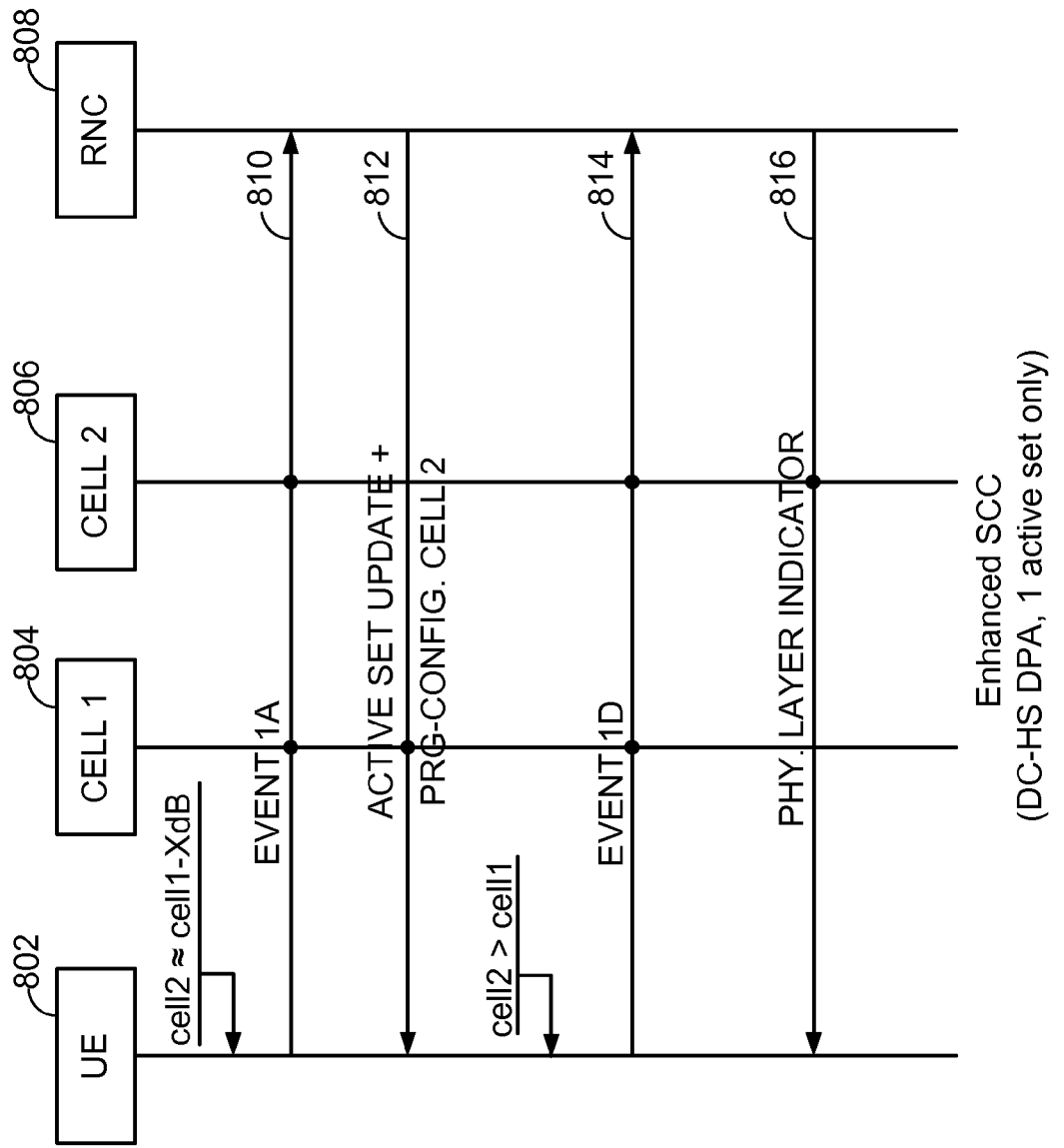
FIG. 8 is a call flow diagram illustrating an enhanced serving cell change procedure.

Thus, another enhancement provided in release-8 was the enhanced serving cell change (E-SCC). Briefly, E-SCC is an improved soft handover procedure that reduces dropped calls during a situation where a UE is moving rapidly from one cell to another. FIG. 8 is a call flow diagram illustrating a soft handover process in an FDD HSDPA or a DC-HSDPA system as illustrated in either one of FIG. 5 or 6. As in the scenario illustrated in FIG. 7, here, when a neighboring cell, i.e., cell 2 806, has a pilot signal power that exceeds a threshold, the UE 802 may provide an RRC Measurement Report message 810 including notification of event 1a. The RNC 808 may then respond to the Measurement Report message 810 with an RRC Active Set Update message 812. However, here, the RRC Active Set Update message 812 includes pre-configuration information relating to cell 2 806, which the UE 802 may then store for utilization if cell 2 806 later becomes the serving cell for that UE 802. Now, if and when the pilot signal power of cell 2 806 exceeds that of cell 1 804, the UE 802 may provide a second RRC Measurement Report message 814 including notification of event 1d. In response to the Measurement Report message 814, the RNC 808 may then instruct cell 2 806 to transmit a physical (PHY) layer indication 816, which in one example may simply be a single bit of information, to instruct the UE 802 to change its serving cell to the target cell, that is, cell 2 806. Because the RRC Active Set Update message 812 already received by the UE 802 included the needed information relating to cell 2 806, the UE 802 does not require any further transmissions (such as RRC messages) from cell 1 804 to complete the handover. This is basically how E-SCC improves a handover in a scenario where the signal from cell 1 804 drops off very quickly.

Moving on, in release-9 of the 3GPP family of standards, dual carriers were provided for both the high-speed downlink, as before, as well as the high-speed uplink (DC-HSUPA). Prior to release-9, during a soft handover in DC-HSDPA, as illustrated in FIG. 6, while the first carrier f1 utilized the same scheme in uplink and downlink as that of the single carrier soft handover in FIG. 5, the second carrier f2 only provided a downlink channel 616 from the serving cell 604. However, in a release-9-capable DC-HSUPA system, the second carrier f2 utilizes the same scheme in uplink and downlink as that of the first carrier f1, including TPC information on downlink channels from the source cell and the target cell, and an uplink channel separated from the second downlink by the duplex distance. Thus, in a DC-HSUPA system, an Active Set is maintained in the UE for each of the first carrier f1 and the second carrier f2.

As networks are upgraded from release-8 systems to release-9 systems, it is practically inevitable that some Node Bs in a service area will be upgraded to release-9 while other Node Bs in the same service area will remain as release-8 units. Thus, when a UE is utilizing such a network, a handover from a release-9 Node B to a release-8 Node B, and vice-versa, is bound to occur. An issue with this scenario relates to the situation wherein a UE, served by a source cell configured to accept two high-speed uplink carriers from the UE, maintains two Active Sets, one corresponding to neighboring cells utilizing each respective carrier frequency. When the UE undergoes a serving cell change to the release-8 cell, which is limited to supporting one uplink carrier frequency during a communication session with the UE, the UE may not require both of the Active Sets. That is, when a release-8 cell is the serving cell, the UE only maintains one Active Set corresponding to the anchor or primary carrier frequency, and does not maintain an Active Set corresponding to the secondary downlink carrier. Here, an issue that arises is related to enhanced serving cell change (E-SCC). That is, when E-SCC was defined in the release-8 specifications, DC-HSUPA had not yet been introduced, so the maintenance of more than one Active Set was not contemplated. Thus, the signaling related to removing the Active Set corresponding to the secondary carrier was not previously defined.

According to an aspect of the present disclosure, in the case of a legacy SCC, as illustrated in FIG. 7, the RRC Transport Channel Reconfiguration Request message may further include information indicating that cell 2 is not a release-9-capable cell, and/or information to enable the UE to remove the active set corresponding to one of the two carriers.

According to another aspect of the present disclosure, in the case of an E-SCC, as illustrated in FIG. 8, the RRC Active Set Update message that includes pre-configuration information corresponding to cell 2 may further include information indicating that cell 2 is not a release-9 capable cell, and/or information to enable the UE to remove the active set corresponding to one of the two carriers.

Figure 9:
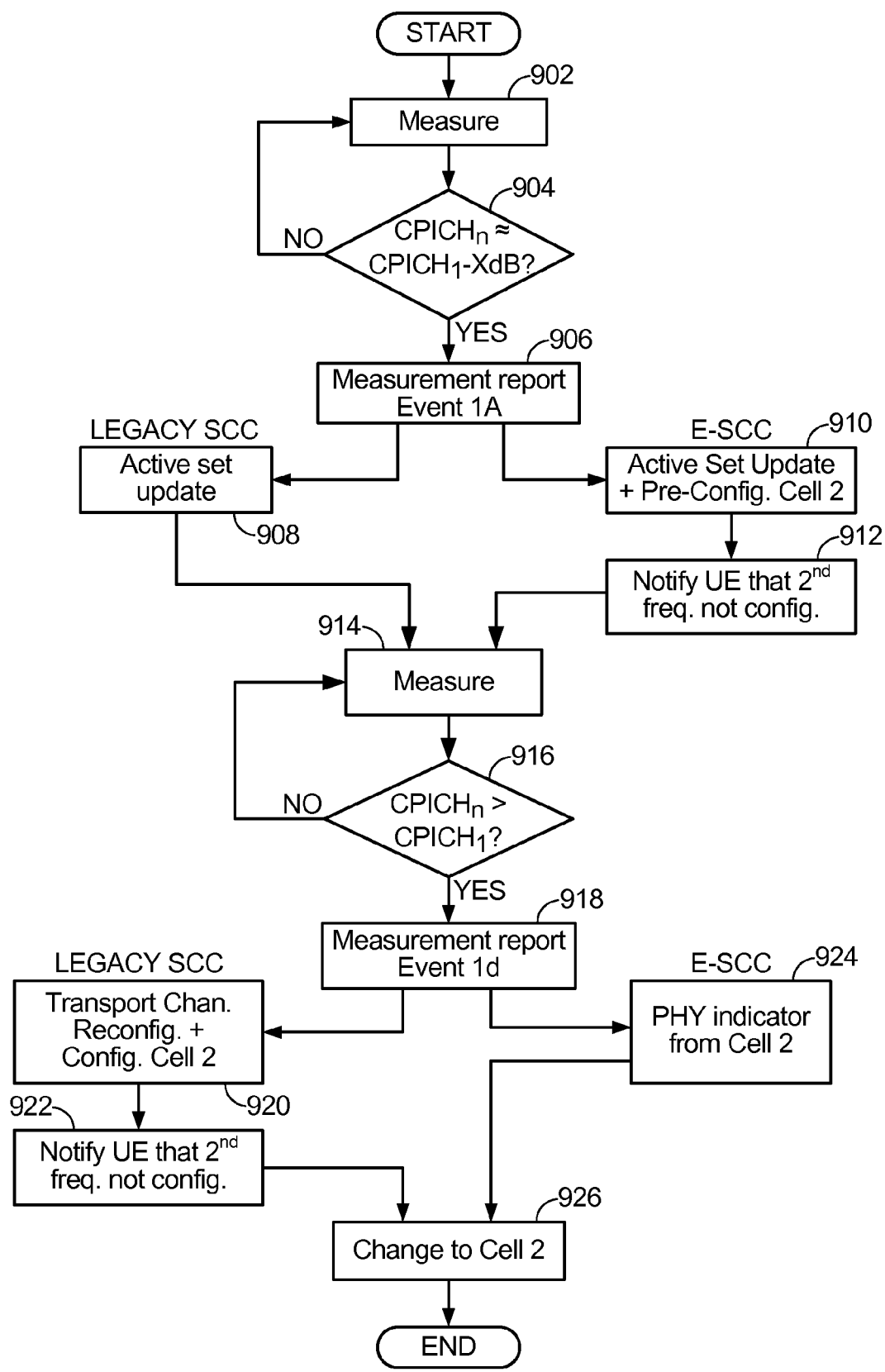
FIG. 9 is a flow chart illustrating a procedure for a handover from a DC-HSUPA system to a non-DC-HSUPA-capable system.

FIG. 9 is a flow chart illustrating exemplary processes of performing a handover from a release-9-capable DC-HSUPA cell to a release-8 DC-HSDPA cell according to certain aspects of the disclosure. In the figure, blocks to the left represent a course of action when utilizing a legacy SCC, and blocks to the right represent a course of action when utilizing E-SCC. In some aspects of the disclosure, the process illustrated in FIG. 9 may be performed by a processing system 100 such as that illustrated in FIG. 1. In some aspects of the disclosure, the process illustrated in FIG. 9 may be performed by a UE 210 in communication with a plurality of Node Bs 208 and at least one RNC 206 in a wireless network 200 such as that illustrated in FIG. 2. In some aspects of the disclosure, various steps of the process illustrated in FIG. 9 may be performed by combinations of the receiver 454, transmitter 456, the processors 460, 470, 494, 490, 482, and 480, and the memory 492 of a UE 450, and corresponding components of the Node B 410, as illustrated in FIG. 4. Those skilled in the art will comprehend that other suitable means for performing the functions to be described may be utilized as well within the scope of the instant disclosure.

Here, the illustrated exemplary process starts with a UE (in an FDD system) utilizing as a serving cell a Node B in a wireless network. In block 902, the process monitors or measures various parameters of the serving cell, as well as various parameters of neighboring cells. For example, a UE may utilize a receiver 454 and a channel processor 494 (see FIG. 4) to measure a pilot signal power of a common pilot channel CPICH corresponding to one or more cells in the general vicinity of the UE. When the UE detects 904 that one of the neighboring cells, called cell n for convenience, begins to have certain signal qualities that are approaching corresponding qualities of the signal provided from the serving cell, then in block 906 the UE may provide a Measurement Report message on the uplink including an indication that the signal from the respective cell is within a reporting range (i.e., event 1a).

In the event that the system utilizes a legacy SCC, then following the sending 906 of the Measurement Report message from the UE, the system responds to the event 1a indication by providing 908 an Active Set Update message from an RNC to the UE, indicating that the UE should add the corresponding cell to its Active Set. However, in the event that the system utilizes E-SCC, then following the sending 906 of the Measurement Report message from the UE, the system responds to the event 1a indication by providing 910 an Active Set Update message from the RNC to the UE, indicating that the UE should add the corresponding cell to its Active Set, as well as pre-configuration information to enable the UE to utilize the corresponding cell upon the event that that cell becomes the serving cell in the future. Further, in block 912, the process provides information to enable the UE to change its Active Set and/or add or remove one of the Active Sets. For example, the RNC may notify the UE that the second frequency is not configured in the target cell, such that the UE is aware that the corresponding cell is not DC-HSUPA-capable or that the RNC does not want to configure DC-HSUPA in the corresponding cell. In this instance the UE may only utilize one Active Set. Further, the RNC may notify the UE that the target cell uses one or more additional frequencies, such that the UE may add the corresponding Active Set or Sets. Thus, in general, according to various aspects of the disclosure, any number of radio links may be used by the Target Cell, and the UE may add or remove the corresponding number of Active Sets, including removing all of the Active Sets from the UE. Still further, when one or more Active Sets are added, or when one or more, but not all Active Sets are removed at the UE, one or more remaining Active Sets may be changed. That is, in an aspect of the disclosure, concomitant to the adding or removing of one or more Active Sets, cells listed in a remaining Active Set may be added and/or removed, and the position of a cell within the Active Set, such as the serving cell, may be changed as well.

Following the messaging from the network, in block 914 the process monitors or measures various parameters of the serving cell and neighboring cells at the UE. In block 916, the process determines that a certain signal quality of the target cell, such as a signal power of a pilot signal CPICH from the corresponding target cell n, is greater than the corresponding signal quality of the serving cell. In this case, in block 918, the process provides a message from the UE to the RNC including a Measurement Report message having an indicator of event 1d.

In the event that the system utilizes a legacy SCC, then following the sending of the Measurement Report message 918 from the UE, the system responds to the event 1d indication by providing a Transport Channel Reconfiguration Request 920 or other similar RRC message, such as a Radio Bearer Reconfiguration message or Physical Channel Reconfiguration message, including configuration information to enable the UE to utilize the corresponding cell after the target cell becomes the serving cell. Further, in block 922, the process provides information to enable the UE to change its Active Set or remove one of the Active Sets. For example, the RNC may notify the UE that the second frequency is not configured in the corresponding cell, such that the UE is aware that the corresponding cell is not DC-HSUPA-capable and only utilizes one Active Set. However, in the event that the system utilizes E-SCC, then following the sending 918 of the Measurement Report message from the UE, the system responds to the event 1d indication by providing 924 a physical layer indicator over the air from the target cell to indicate for the UE to change to the target cell. Here, the UE received pre-configuration information in block 910 as a part of the E-SCC signaling, and further received information to enable the UE to change its Active Set or remove one of the Active Sets in block 912. Thus, providing the physical layer indicator 924 is sufficient to trigger a serving cell change. Thus, in block 926, the process changes the UE to utilize the target cell as its new serving cell.

Several aspects of a telecommunications system have been presented with reference to an FDD W-CDMA system. As those skilled in the art will readily appreciate, various aspects described throughout this disclosure may be extended to other telecommunication systems, network architectures and communication standards. By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using computer software, various electrical components such as electronic hardware, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

In one or more aspects of the disclosure, the functions described may be implemented in hardware, software, firmware, or any combination thereof. If implemented in software, the functions may be stored on or transmitted over as one or more instructions or code on a computer-readable medium. Computer-readable media may be transitory or non-transitory, and may include both computer storage media and communication media including any medium that facilitates transfer of a computer program from one place to another. Storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are transitory entities included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Computer-readable media may be embodied in a computer-program product. By way of example, but without limitation, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication in a wireless network, comprising:
   establishing communication with the wireless network utilizing a first carrier and a second carrier for each of an uplink and a downlink;
   maintaining a first active set comprising a list of any cells in the wireless network that meet first criteria, the first active set corresponding to the first carrier;
   maintaining a second active set comprising a list of any cells in the wireless network that meet second criteria, the second active set corresponding to the second carrier;
   reporting that a target cell meets third criteria; and
   receiving, in response to reporting the target cell meets the third criteria,
      (i) configuration information from the wireless network for configuring wireless communication with the target cell, wherein the configuration information indicates that the target cell is not a Release-9 capable cell, and
      (ii) a notification indicating that the target cell does not support the second carrier, the notification comprising information enabling removal of the second active set.

2. The method of claim 1, wherein the receiving of the notification occurs prior to changing to the target cell.

3. The method of claim 1, wherein the first criteria comprises a first threshold power level corresponding to a reference signal received from respective ones of the cells utilizing the first carrier, and wherein the second criteria comprises a second threshold power level corresponding to a reference signal received from respective ones of the cells utilizing the second carrier.

4. The method of claim 3, wherein the third criteria comprises a certain power level compared to a measured power of a reference signal received from a present serving cell.

5. The method of claim 1, wherein the notification comprises information indicating that the target cell supports an uplink limited to one carrier frequency during a communication session.

6. The method of claim 1, wherein the first carrier is an anchor carrier and the second carrier is a secondary carrier.

7. The method of claim 1, wherein the first carrier is a secondary carrier and the second carrier is an anchor carrier.

8. The method of claim 1, wherein the maintaining of the first active set comprises receiving a downlink physical channel from each of the cells in the wireless network that meet the first criteria; and wherein the maintaining of the second active set comprises receiving a downlink physical channel from each of the cells in the wireless network that meet the second criteria.

9. The method of claim 1, wherein the notification comprises a physical layer message.

10. The method of claim 1, wherein the notification utilizes a layer higher than a physical layer.

11. The method of claim 1, further comprising changing the first active set to include a second list of cells in the wireless network that meet the first criteria, the second list of cells being different than the list of any cells in the wireless network that meet the first criteria.

12. An apparatus for communication in a wireless network, comprising:
   means for establishing communication with the wireless network utilizing a first carrier and a second carrier for each of an uplink and a downlink;
   means for maintaining a first active set comprising a list of any cells in the wireless network that meet first criteria, the first active set corresponding to the first carrier;
   means for maintaining a second active set comprising a list of any cells in the wireless network that meet second criteria, the second active set corresponding to the second carrier;
   means for reporting that a target cell meets third criteria; and
   means for receiving, in response to reporting the target cell meets the third criteria,
      (i) configuration information from the wireless network for configuring wireless communication with the target cell, wherein the configuration information indicates that the target cell is not a Release-9 capable cell, and
      (ii) a notification indicating that the target cell does not support the second carrier, the notification comprising information enabling removal of the second active set.

13. The apparatus of claim 12, wherein the means for receiving the notification is configured to receive the notification prior to changing to the target cell.

14. The apparatus of claim 12, wherein the first criteria comprises a first threshold power level corresponding to a reference signal received from respective ones of the cells utilizing the first carrier, and wherein the second criteria comprises a second threshold power level corresponding to a reference signal received from respective ones of the cells utilizing the second carrier.

15. The apparatus of claim 14, wherein the third criteria comprises a certain power level compared to a measured power of a reference signal received from a present serving cell.

16. The apparatus of claim 12, wherein the notification comprises information indicating that the target cell supports an uplink limited to one carrier frequency during a communication session.

17. The apparatus of claim 12, wherein the first carrier is an anchor carrier and the second carrier is a secondary carrier.

18. The apparatus of claim 12, wherein the first carrier is a secondary carrier and the second carrier is an anchor carrier.

19. The apparatus of claim 12, wherein the means for maintaining the first active set comprises means for receiving a downlink physical channel from each of the cells in the wireless network that meet the first criteria; and wherein the means for maintaining the second active set comprises means for receiving a downlink physical channel from each of the cells in the wireless network that meet the second criteria.

20. The apparatus of claim 12, wherein the notification comprises a physical layer message.

21. The apparatus of claim 12, wherein the notification utilizes a layer higher than a physical layer.

22. The apparatus of claim 12, further comprising means for changing the first active set to include a second list of cells in the wireless network that meet the first criteria, the second list of cells being different than the list of any cells in the wireless network that meet the first criteria.

23. A computer program product for use in a wireless network, comprising:
   a non-transitory computer-readable medium comprising code for:
      establishing communication with the wireless network utilizing a first carrier and a second carrier for each of an uplink and a downlink;
      maintaining a first active set comprising a list of any cells in the wireless network that meet first criteria, the first active set corresponding to the first carrier;

maintaining a second active set comprising a list of any cells in the wireless network that meet second criteria, the second active set corresponding to the second carrier;

reporting that a target cell meets third criteria; and receiving, in response to reporting the target cell meets the third criteria, (i) configuration information from the wireless network for configuring wireless communication with the target cell, wherein the configuration information indicates that the target cell is not a Release-9 capable cell, and (ii) a notification indicating that the target cell does not support the second carrier, the notification comprising information enabling removal of the second active set.

24. The computer program product of claim 23, wherein the code for receiving the notification comprises code for receiving the notification prior to changing to the target cell.

25. The computer program product of claim 23, wherein the first criteria comprises a first threshold power level corresponding to a reference signal received from respective ones of the cells utilizing the first carrier, and wherein the second criteria comprises a second threshold power level corresponding to a reference signal received from respective ones of the cells utilizing the second carrier.

26. The computer program product of claim 25, wherein the third criteria comprises a certain power level compared to a measured power of a reference signal received from a present serving cell.

27. The computer program product of claim 23, wherein the notification comprises information indicating that the target cell supports an uplink limited to one carrier frequency during a communication session.

28. The computer program product of claim 23, wherein the first carrier is an anchor carrier and the second carrier is a secondary carrier.

29. The computer program product of claim 23, wherein the first carrier is a secondary carrier and the second carrier is an anchor carrier.

30. The computer program product of claim 23, wherein the code for maintaining the first active set comprises code for receiving a downlink physical channel from each of the cells in the wireless network that meet the first criteria; and wherein the code for maintaining the second active set comprises code for receiving a downlink physical channel from each of the cells in the wireless network that meet the second criteria.

31. The computer program product of claim 23, wherein the notification comprises a physical layer message.

32. The computer program product of claim 23, wherein the notification utilizes a layer higher than a physical layer.

33. The computer program product of claim 23, further comprising code for changing the first active set to include a second list of cells in the wireless network that meet the first criteria, the second list of cells being different than the list of any cells in the wireless network that meet the first criteria.

34. An apparatus for communication in a wireless network, comprising:

at least one processor; and a memory coupled to the at least one processor, wherein the at least one processor is configured to:

establish communication with the wireless network utilizing a first carrier and a second carrier for each of an uplink and a downlink;

maintain a first active set comprising a list of any cells in the wireless network that meet first criteria, the first active set corresponding to the first carrier;

maintain a second active set comprising a list of any cells in the wireless network that meet second criteria, the second active set corresponding to the second carrier;

report that a target cell meets third criteria; and receive, in response to reporting the target cell meets the third criteria, (i) configuration information from the wireless network for configuring wireless communication with the target cell, wherein the configuration information indicates that the target cell is not a Release-9 capable cell, and (ii) a notification indicating that the target cell does not support the second carrier, the notification comprising information enabling removal of the second active set.

35. The apparatus of claim 34, wherein the at least one processor is configured to receive the notification prior to changing to the target cell.

36. The apparatus of claim 34, wherein the first criteria comprises a first threshold power level corresponding to a reference signal received from respective ones of the cells utilizing the first carrier, and wherein the second criteria comprises a second threshold power level corresponding to a reference signal received from respective ones of the cells utilizing the second carrier.

37. The apparatus of claim 36, wherein the third criteria comprises a power level at least as great a measured power of a reference signal received from a present serving cell.

38. The apparatus of claim 34, wherein the notification comprises information indicating that the target cell supports an uplink limited to one carrier frequency during a communication session.

39. The apparatus of claim 34, wherein the first carrier is an anchor carrier and the second carrier is a secondary carrier.

40. The apparatus of claim 34, wherein the first carrier is a secondary carrier and the second carrier is an anchor carrier.

41. The apparatus of claim 34, wherein the at least one processor is configured to receive a downlink physical channel from each of the cells in the wireless network that meet the first criteria; and wherein the at least one processor is configured to receive a downlink physical channel from each of the cells in the wireless network that meet the second criteria.

42. The apparatus of claim 34, wherein the notification comprises a physical layer message.

43. The apparatus of claim 34, wherein the notification utilizes a layer higher than a physical layer.

44. The apparatus of claim 34, wherein the at least one processor is further configured to change the first active set to include a second list of cells in the wireless network that meet the first criteria, the second list of cells being different than the list of any cells in the wireless network that meet the first criteria.

45. The method of claim 1, wherein the configuration information comprises an indicator to add the target cell to the first active set.

46. The method of claim 1, further comprising:

reporting that the target cell meets fourth criteria;

receiving, in response to reporting the target cell meets the fourth criteria, an indicator to change to the target cell; and changing, in response to receiving the indicator, to the target cell such that the target cell becomes a new serving cell.

47. The method of claim 46, wherein the configuration information and the notification is received if the changing to the target cell such that the target cell becomes the new serving cell is an enhanced serving cell change (E-SCC).

48. The method of claim 46, wherein the fourth criteria comprises a certain power level compared to a measured power of a reference signal received from a present serving cell.

49. The method of claim 46, wherein the indicator to change to the target cell is received if the changing to the target cell such that the target cell becomes the new serving cell is an enhanced serving cell change (E-SCC), and wherein the indicator comprises a physical layer message.

50. The method of claim 1, wherein the configuration information indicates that the target cell supports only one uplink carrier frequency during the communication.

* * * * *